United States Patent
Schlattmann et al.

(10) Patent No.: US 9,633,434 B2
(45) Date of Patent: Apr. 25, 2017

(54) CALIBRATION OF CAMERA-BASED SURVEILLANCE SYSTEMS

(71) Applicant: AGT INTERNATIONAL GMBH, Zurich (CH)

(72) Inventors: Markus Schlattmann, Griesheim (DE); Ulf Blanke, Zurich (CH)

(73) Assignee: AGT INTERNATIONAL GMBH, Zurich (CH)

( * ) Notice: Subject to any disclaimer, the term of this patent is extended or adjusted under 35 U.S.C. 154(b) by 169 days.

(21) Appl. No.: 14/415,584

(22) PCT Filed: Jul. 18, 2013

(86) PCT No.: PCT/EP2013/065183
§ 371 (c)(1),
(2) Date: Jan. 18, 2015

(87) PCT Pub. No.: WO2014/013015
PCT Pub. Date: Jan. 23, 2014

(65) Prior Publication Data
US 2015/0154753 A1    Jun. 4, 2015

(30) Foreign Application Priority Data
Jul. 18, 2012   (EP) ..................... 12176887

(51) Int. Cl.
*G06T 7/00* (2006.01)
*H04N 7/18* (2006.01)

(52) U.S. Cl.
CPC ........... *G06T 7/0018* (2013.01); *H04N 7/181* (2013.01); *G06T 2207/30221* (2013.01); *G06T 2207/30232* (2013.01)

(58) Field of Classification Search
CPC ......... G06T 7/0018; G06T 2207/30232; G06T 2207/30221; H04N 7/181
See application file for complete search history.

(56) References Cited

U.S. PATENT DOCUMENTS 5,912,700 A * 6/1999 Honey ................... H04N 5/262
348/157
6,295,367 B1   9/2001 Crabtree et al.
(Continued)

FOREIGN PATENT DOCUMENTS

CN   101727671 B   5/2012
DE   102007001649   7/2008
(Continued)

OTHER PUBLICATIONS

Amol Borkar et al.: "A Non Overlapping Camera Network: Calibration and Application Towards Lane Departure Warning", Jul. 2011.
(Continued)

*Primary Examiner* — Gevell Selby
(74) *Attorney, Agent, or Firm* — Browdy and Neimark, PLLC (57) ABSTRACT

A computer implemented method, computer program product, and computer system for determining camera calibration data. The computer system receives geo-positional data of a moving object, wherein the geo-positional data is associated with an indicator (112). The computer system receives further a sequence of frames (140) from the at least one camera (150), wherein at least one frame has a picture of the moving object (118) with a structure and with an encoded version of the indicator which are optically recognizable. The indicator associated with the at least one frame is extracted by decoding (170) the optically encoded version of the indicator of the at least one frame. The geo-positional data of the moving object which is in the picture of the at least one frame is obtained by matching (172) the indicator associated with the geo-positional data of the moving object and the decoded indicator associated with the at least one frame. At least one reference point of the at least one frame is identified by analyzing the optically recognizable struc- (Continued)

ture in the picture of the at least one frame. The camera calibration data of the at least one camera is determined by applying a geometric transformation (174) on the at least one reference point and its associated geopositional data of the moving object which is in the at least one frame.

13 Claims, 8 Drawing Sheets

(56) References Cited

U.S. PATENT DOCUMENTS

| | | | |
|---|---|---|---|
| 2005/0140783 | A1 | 6/2005 | Akamatsu |
| 2006/0007308 | A1 | 1/2006 | Ide et al. |
| 2008/0240616 | A1 | 10/2008 | Haering et al. |
| 2009/0040301 | A1 | 2/2009 | Sandler et al. |
| 2010/0245593 | A1 | 9/2010 | Kim et al. |
| 2011/0240742 | A1* | 10/2011 | Li .................... G06K 7/1443 235/462.11 |
| 2013/0336583 | A1 | 12/2013 | Ernst et al. |
| 2016/0035143 | A1* | 2/2016 | Hansen ............ H04N 1/00342 348/157 |

FOREIGN PATENT DOCUMENTS

| | | |
|---|---|---|
| EP | 1744292 A2 | 1/2007 |
| EP | 2309451 A1 | 4/2011 |
| GB | 2395551 | 5/2004 |

OTHER PUBLICATIONS

Barron J L et al.: "Systems and Experiment performance of Optical flow technique", International Journal of Computer Vision. Kluwer Academic Publishers, Norwell, US, vol. 12, No. 1, Jan. 1, 1994, pp. 43-77, XP001109171, ISSN: 0920-5691, DOI: 10.1007/BF0140984.

Burt P J et al.: "Object tracking with a moving camera" Visual Motion, 1989, Proceedings. Workshop on Irvine, CA, USA Mar. 20-22, 1989, Washington, DC, USA, IEEE Comput. Soc. PR, XP010014669. DOI: 10.1109/WVN.1989.47088. ISBN: 978-0/8186-1903-8.

Chen et al.: "Wide Area Camera Calibration Using Virtual Calibration Objects", Proceedings of Computer Vision and Pattern Recognition, pp. 520-527, 2000.

Chen and Leung: "Multi-Camera Tracking by Joint Calibration, Association and Fusion", Department of Electrical and Computer Engineering University of Calgary. Calgary, Alberta, Canada, 2011, IEEE.

European Search Report from EP12176857 dated Dec. 18, 2012.
European Search Report from EP2709058 dated Dec. 13, 2012.
Hu W et al.: "A Survey on Visual Surveillance of Object Motion and Behaviors", IEEE Transactions on Systems, MAN and Cybernetics: Part C: Applications and Reviews, IEEE Service Center, Piscataway, NJ, US, vol. 34, No. 3, Aug. 1, 2004, pp. 334-352, XP011114887, ISSN: 1094-6977, DOI: 10.1109/TSMCC.2004. 829274.

International Search Report together with Written Opinion from PCT/EP2013/065174 dated Dec. 12, 2013.

International Search Report together with Written Opinion from PCT/EP2013/065183 dated Dec. 9, 2013.

Kanhere and Birchfield: "A Taxonomy and Analysis of Camera Calibration Methods for Traffic Monitoring Applications", Intelligent Transportation Systems, IEEE vol. 11 Issue 2, pp. 441-452, ISSN: 1524-9050, Jun. 2010.

Marta Wilczkowiak et al.: "Camera Calibration and 3D Reconstruction from Single Images Using Parallelepipeds", inria-00525657, version 1—May 26, 2011.

Rahimi et al.: "Simultaneous Calibration and Tracking with a Network of Non-Overlapping Sensors", Proceedings of Computer Vision and Pattern Recognation, pp. 187-194, 2004.

Svoboda et al.: "A Convenient Multi-Camera Self-Calibration for Virtual Environments", Computer Vision Lab Department of Information Technology and Electrical Engineering Swiss Federal Institute of Technology and Centre for Machine Perception Department of Cybernetics, Czech Technical University in Prague. Revised version: Jun. 16, 2004.

Yao-Te Tsai et al.: "Multiple Human Objects Tracking in crowded Scene", 18th International Conference on Pattern Recognation (ICPR '06), vol. 3, Jan. 1, 2006, pp. 51-54, XP055046751, DOI: 10.1109/ICPR.2006.841, ISBN: 978-0-76-952521-1.

Yilmaz Alper et al.: "Object Tracking: A Survey", ACM Computing Surveys, ACM, New York, NY, US, vol. 38, No. 4, Dec. 1, 2006, pp. 1-45, XP007902942. ISSN: 0360-0300.

* cited by examiner

CALIBRATION OF CAMERA-BASED SURVEILLANCE SYSTEMS

CROSS-REFERENCE TO RELATED APPLICATIONS

This application is a National Phase Application of PCT International Application No. PCT/EP2013/065183, International Filing Date Jul. 18, 2013, claiming priority of EP Patent Application No. 12176887.3, filed Jul. 18, 2012, which are hereby incorporated by reference in their entirety.

TECHNICAL FIELD

The present invention generally relates to camera-based surveillance systems, and more particularly, relates to systems, methods, and computer program products for efficient calibration of networks with a plurality of video cameras.

BACKGROUND

Video cameras, hereinafter called cameras, are commonly used for security surveillance. A camera provides video data of whatever is within its field of view (FOV). In a typical surveillance scenario, a network of cameras is deployed for the comprehensive coverage of an area. The video data obtained by such a network may then be observed in real time and/or reviewed later by a human operator and/or by an automated system.

The situational awareness of the observing entity of the video data of the various cameras may be important. Situational awareness is particularly supported by high-precision camera calibration, especially by the location of each camera. Such knowledge may be important in dense, urban surveillance areas with narrow, winding streets and busy traffic circulation which involve pedestrians and various vehicles.

Camera calibration within a geo-referenced coordinate system refers to the process of obtaining intrinsic and extrinsic camera parameters. In the following, these parameters are referred to as camera calibration parameters. Intrinsic camera calibration parameters are, for example, focal length, image format, principal point, and lens distortion; extrinsic camera parameters are, for instance, the geo-positional location and orientation. Camera calibration is also known as camera resectioning.

In existing surveillance networks, however, cameras are rarely sufficiently calibrated. Often, the camera locations are only roughly associated with street names or with estimates from the data of a Global Positioning System (GPS). The accuracy can deviate for more than a hundred meters from an actual geo-positional location.

A camera can be calibrated by placing an object into its FOV. Knowing the geo-positional information of the object and knowing some reference points of the object (in the picture taken by the camera) allows for calculating the camera calibration parameters.

The following references address the calibration of multiple cameras:

Chen, Davis, and Slusallek, "Wide Area Camera Calibration Using Virtual Calibration Objects". In: Proceedings of Computer Vision and Pattern Recognition, pp. 520-527, 2000.

Rahimi, Dunagan, and Darrell, "Simultaneous Calibration and Tracking with a Network of Non-Overlapping Sensors". In: Proceedings of Computer Vision and Pattern Recognition, pp. 187-194, 2004.

In a network with multiple cameras, an object can be moved through the area and its respective geo-positional information can be logged. The geo-positional information has then to be matched to the corresponding video data. The matching can be achieved by, for example, a clock which is synchronized across the cameras and the logged geo-positional information. In large surveillance networks, however, this synchronization is rarely given. Hence, a manual readjustment has to be performed. This can be a tedious and expensive task, if possible at all.

SUMMARY

Therefore, there is a need to ensure efficient and precise matching of video data from at least one camera to the geo-positional information of an object which may be moved through an area with a large number of cameras.

The problem is solved by an aspect of the invention, where the video data includes an optically encoded indicator associated with the movable object. A computer implemented method for determining camera calibration data includes: receiving geo-positional data of a moving object, wherein the geo-positional data is associated with an indicator; receiving a sequence of frames from the at least one camera, wherein at least one frame has a picture of the moving object with a structure and with an encoded version of the indicator which are optically recognizable; extracting the indicator associated with the at least one frame by decoding the optically encoded version of the indicator of the at least one frame; obtaining the geo-positional data of the moving object which is in the picture of the at least one frame by matching the indicator associated with the geo-positional data of the moving object and the decoded indicator associated with the at least one frame; identifying at least one reference point of the at least one frame by analyzing the optically recognizable structure in the picture of the at least one frame; and determining the camera calibration data of the at least one camera by applying a geometric transformation on the at least one reference point and its associated geo-positional data of the moving object which is in the at least one frame.

Through this approach, the indicator is transmitted as part of the video data. In other words, the indicator is embedded into the video data. The indicator basically represents matching information for a particular video frame and the respective geo-positional data of a movable object. The latency of the optical transmission of the indicator to the camera is insignificant (speed of light). Therefore, the indicator ensures the accurate matching of the geo-positional data of the movable object and the respective video frame within which the object and the indicator are shown. The video data can automatically be analyzed by image processing and computer vision techniques without any manual readjustment of the data sources. Eventually, the camera calibration data can be derived from the location data (geo-positional data) of the movable object and the corresponding 2-dimensional (2D) coordinates of this object in the video data. Because the matching information, that is the indicator, is transmitted as part of the video data any standard surveillance camera can be used without a need of hardware modifications.

Alternative embodiments of the invention can be realized by processing an indicator which is transmitted in a parallel mode. Such a parallel optical transmission can be accomplished by, for example, an array with a plurality of light-emitting diodes (LED). The array can be placed on the movable object and the LEDs can transmit the encoded indicator. The indicator can be, for example, a timestamp obtained from any GPS. The timestamp can be extracted from the video data and assigned to the current video frame by image processing and computer vision techniques. Then, the logged geo-positional data of the object which also includes corresponding timestamps per tuple, that is, a sequence of tuples including [longitude, latitude, time], can be matched to video frames that are marked with timestamps.

This approach may be advantageous in that ideally only one video frame of the video data of the movable object is required for obtaining the camera calibration data. Moreover, the number of LEDs is flexible and can be adapted to the calibration scenario. For example, the indicator can be transmitted 10 times per second (10 hertz (Hz)). In the case that the object moves through an area for an hour (3600 seconds), the number of indicators transmissions is approximately 36000. Persons of skill in the art can select the number of LEDs accordingly. In case of binary encoding per LED (e.g., on|off), at least 16 LEDs have to be used to cover the number of indicator transmissions of the example.

Alternative embodiments of the invention can also be realized by processing an indicator which is transmitted in a serial mode. Such a serial transmission can be accomplished by, for example, a single LED. The LED can be placed on the movable object and transmit a pseudo-randomized (the person with skill in the art knows, that the generation of truly randomized values is not possible) blink signal, and, therefore, the signal appears non-equidistant. The state of each blink signal can be extracted from the video data and can be associated with the corresponding sequence of video frames by image processing and computer vision techniques. Then, the logged sequence of geo-positional data of the object which also includes a corresponding blink state per tuple (e.g., [longitude, latitude, blink=1|0]) can be matched to the sequence of video frames. Alternatively, a partial sequence of that blink signal can be used.

This alternative embodiment of the invention delivers several pairs of matched video frames/geo-positional data, wherein each pair can be used for obtaining the camera calibration data. Through this approach, image processing can be performed more robust, since there is no need to identify several optical signals in one video frame.

Another alternative embodiment of the invention can be realized by combining parallel and serial modes.

Embodiments of the invention can be implemented as a computer program product, a computer system, a movable object, and a system for camera calibration. The computer system can run the computer program product to execute the method.

Further aspects of the invention will be realized and attained by means of the elements and combinations particularly depicted in the appended claims. It is to be understood that both, the foregoing general description and the following detailed description are exemplary and explanatory only and are not restrictive of the invention as described.

The figures are non-scaled drawings. The sizes of the pictograms, such as the movable object, the camera, the components, and the systems, are only symbolically and should not be mistaken to be aligned with each other.

DETAILED DESCRIPTION

Figure 1:
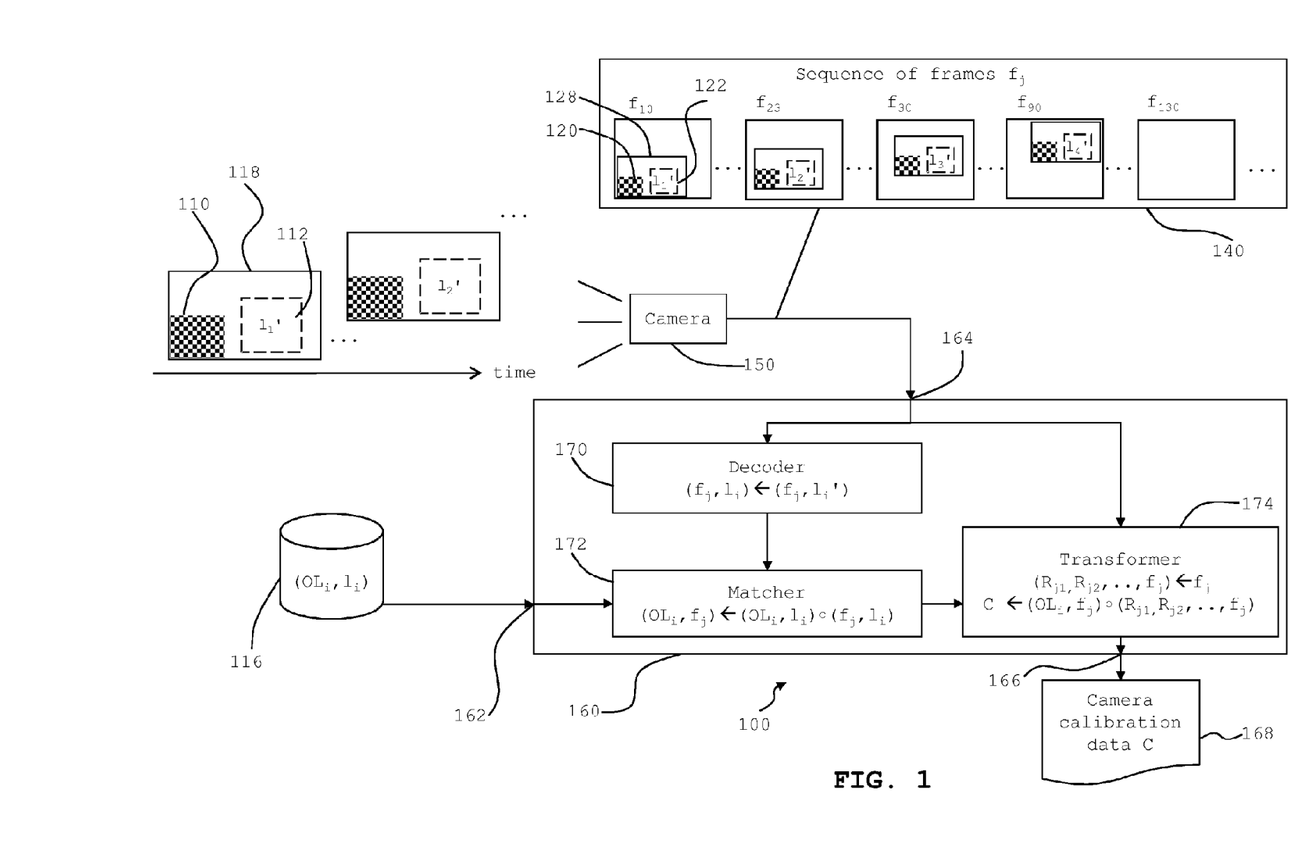
FIG. 1 shows a system for camera calibration according to one embodiment of the invention.

FIG. 1 shows a system for camera calibration 100 according to one embodiment of the invention that includes movable object 118 and computer system 160. Computer system 160 is communicatively coupled to at least one camera 150 (via interface 164), to at least one storage means 116 (via interface 162), and to a camera management component (not shown; via interface 166). The interfaces for coupling can be implemented via any kind of interfacing technology, such as hardware interfaces (e.g., Firewire, Universal Serial Bus (USB), Wireless Adapter), software interfaces, or network interfaces.

For example, movable object 118 can be an automotive, another vehicle, or any other object which is able to be moved through an area which is in the field of view (FOV) of at least one camera. The area can be of, for instance, an urban areal pattern with narrow, winding streets and busy traffic circulation which involve pedestrians and various other vehicles.

Movable object 118 includes structure 110 which is optically recognizable by image processing and computer vision techniques. Structure 110 can be mounted on movable object 118, be a part of it, or be associated with it in other ways. Examples for such an optically recognizable structure are a checkerboard, a texture with differentiable color segments, light-emitting equipment which generates differentiable segments, or any other structure which has an optically distinct surface. Moreover, the structure is designed in such a way, that at least one reference point $R_{jk}$ on the structure can be identified during image recognition processing.

Figure 2:
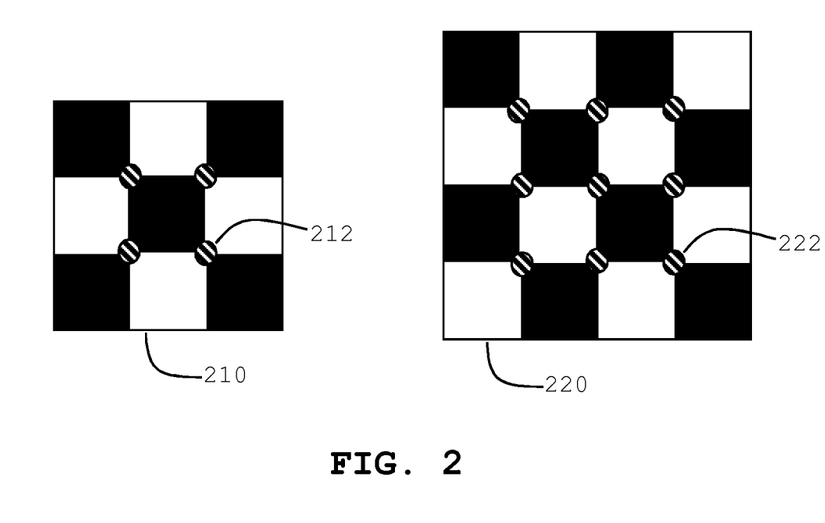
FIG. 2 shows exemplary embodiments for an optically recognizable structure.

FIG. 2 illustrates two alternative embodiments of optically recognizable structure 110 (cf. FIG. 1). Checkerboard 210 has nine fields of known dimensions. For example, intersection 212 of black and white fields is precisely recognizable by image processing and computer vision techniques. A checkerboard with nine fields can provide at least four precisely recognizable reference points. The reference point at intersection 212, for example, can be assigned with 2D coordinates ((u,v)) in frame 624 (cf. FIG. 6). Checkerboard 220 has 16 fields of known dimensions, thus, it can provide at least nine precisely recognizable reference points. In FIG. 2, the recognizable reference points, for example, intersection 212 and 222, are illustrated with black and white striped circles; these circles are only for illustration and do not have to appear on an actual structure.

Generally, a reference point corresponds to a location of an optical structure that is recognizable using image processing and computer vision techniques. The inner corner of a checkerboard, for example, can reliably be recognized by corner detection algorithms: lines are fit to the image using edge detection (e.g., canny edge detector), and their intersection is used to discover the corners. However, also other reference points can be extracted (e.g., the centers of the black and white fields) and other patterns are optically recognizable and usable (e.g., circles instead of rectangles). Reference points are also referred to as salient points which are recognizable due to their unique appearance.

Figure 3:
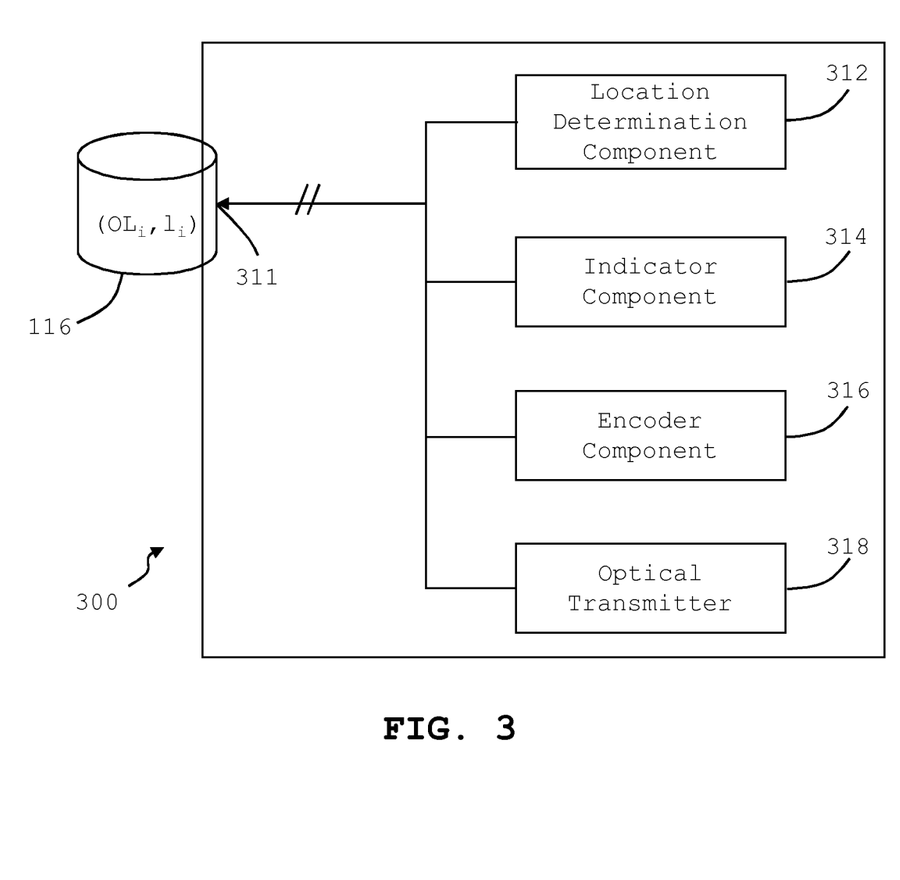
FIG. 3 shows a block diagram with components for the transmission of an encoded indicator and the associations of the indicator with geo-positional data according to one embodiment of the invention.

Returning back to FIG. 1, movable object 118 includes a location determination component, an indicator component, an encoder component, and an optical transmitter (details in FIG. 3). The location determination component can obtain geo-positional data of the current location $OL_i$ of movable object 118. Current location $OL_i$ can be associated with indicator $I_i$ and optionally be stored as a dataset $(OL_i, I_i)$ in storage means 116. The optical transmitter may be configured to transmit encoded indicator $I_i'$; in FIG. 1, the optical transmitter is illustrated by dashed box 112 (the same illustration is used in any of the FIGS. 2-8). Details about the location determination component, the indicator component, the encoder component, and the optical transmitter can be found in the detailed description of FIG. 3.

Camera 150, for example, can be used as a part of a surveillance network with multiple cameras and can observe a part of the surveillance area in its FOV. The video data which is obtained by the camera is sequence 140 of frames, wherein a typical frame rate can be 20 frames per second (fps). The frames $f_j$ can be sent to computer system 160 via interface 164. Alternatively, the video data can be stored intermediately on a storage medium and later be imported into computer system 160 for further processing.

Computer system 160 includes decoder component 170, matcher component 172, and transformer component 174. Moreover, it has first interface 162 to be communicatively coupled to at least one storage means 116 which can hold datasets of geo-positional data $(OL_i, I_i)$ from movable object 118. Computer system 160 further has second interface 164 to receive sequence 140 of frames, and third interface 166 to dispatch camera calibration data 168 to a camera management component (not shown). In FIG. 1, interfaces 162, 164, and 166 are illustrated with an arrowhead directed to a component or system boarder (the same illustration is used in any of the FIGS. 2-8).

Frame sequence 140 is illustrated with exemplary frames. The indices correspond to the frame rate. In the example, there are 120 frames (from $f_{10}$ to $f_{130}$) taken during 6 seconds (e.g., 20 fps). From these 120 frames, frames $f_{10}$, $f_{23}$, $f_{30}$, $f_{90}$ and $f_{130}$, are shown with more detail. In some cases, frames $f_{10}, f_{23}, f_{30}, f_{90}$ can have a representation of movable object 128 in the picture, in other cases, movable object 118 is not in the picture of the frame $f_{130}$. (In the example, the object has moved through the FOV of the camera until $f_{90}$, but left the FOV before $f_{130}$) When the representation of movable object 128 is included in the picture of a frame $f_j$, the decoder component may be used to obtain the indicator value of transmission 122 $((f_j, I_i'))$ of a particular frame $((f_j, I_i))$. The obtained datasets $(f_j, I_i)$ may then be matched with the datasets of the geo-positional data $(OL_i, I_i)$ of movable object 118. That allows to identify the corresponding datasets of the geo-positional data of movable object 118 and its corresponding frame $(OL_i, f_j)$.

Furthermore, when the representation of movable object 128 is included in the picture of a frame $f_j$, at least one reference point $(R_{j1}, R_{j2}, \ldots, f_j)$ may be obtained from optically recognizable structure 120 by image processing and computer vision techniques. (Structure 120 is a representation of structure 110, thus, even if it appears contrary to the drawing in FIG. 1, illustrated checkerboards 110 and 120 have the same field dimensions and numbers.) These reference points $(R_{j1}, R_{j2}, \ldots, f_j)$ may then be used for a geometric transformation with the dataset of geo-positional data $(OL_i, f_j)$ in order to obtain camera calibration data 168.

Techniques for calculating camera calibration data 168 are known in the art, for instance, as homography. In order to obtain a homography, four or more reference points which do not form degenerated cases, such as co-linearity, are identified. A homography is, for example, given by a 3×4 matrix which is used to denote a projective mapping from world coordinates to screen/frame coordinates. World coordinates are, for example, 3-dimensional (3D) points in the world. Screen/frame coordinates are typically 2-dimensional (2D) points in an image.

Depending on the recognition quality of structure 120, in one embodiment, the at least four reference points may be obtained from one frame. In another case, at least four frames may contribute one reference point each. In other cases, the numbers of identifiable reference points per frame can vary, and may be combined to at least four reference points in order to obtain the homography.

In another embodiment, only one reference point for the calculation of the camera calibration data 168 may be required. For example, if intrinsic parameters of the camera, world coordinates of the camera position, and at least one orientation angle are known, the task of calibration is reduced to compute the remaining two orientation angles. This can be solved with a single reference point.

In another embodiment, only two reference points for the camera calibration data 168 may be required. For example, if some of the intrinsic parameters (i.e., image format, principal point, and lens distortion) and the world coordinates of the camera position are known, the task of calibration is reduced to compute the orientation and the focal length. This can be solved with two reference points that do not coincide.

In another embodiment, computer system 160 may receive sequences of frames from multiple cameras in a surveillance network. Movable object 118 may have maneuvered through the FOVs of some or all cameras which send their video data to computer system 160. Computer system 160 may then determine the camera calibration data of each camera by repeating the steps described above, wherein it only requires one dataset of geo-positional data $(OL_i, I_i)$ of movable object 118. Determining camera calibration data 168 for one camera of the plurality of cameras is independent from the other cameras of the plurality of cameras. Particularly, the FOVs of the plurality of cameras do not need to overlap.

Camera calibration data 168 may be sent to a camera management component (not shown) via third interface 166. The camera management component may administer the camera calibration information of one or all cameras. For example, it may update out of date camera calibration information with camera calibration data 168, or provide a notification, if the newly received camera calibration data 168 is out of range of predefined values.

The camera calibration component may be a part of a video management system (not shown). The video management system, for example, may perform automatic surveillance functions on the video data in order to identify conspicuous incidents. Such automatic surveillance functions, for instance, can be based on other techniques, such as, for example, known in the field of machine learning. In the case of an incident, the accurate camera location of the respective camera or cameras can be reported for further analysis. Furthermore, the video management system may have display means, such as computer monitors or tablets, to present the FOV(s) to a human operator for security purposes.

FIG. 3 shows a block diagram of component 300 of movable object 118 (cf. FIG. 1) for the transmission of an encoded indicator and the association of the indicator with geo-positional data, that includes location determination component 312, indicator component 314, encoder component 316, and optical transmitter 318, wherein storage means 116 can be communicatively coupled via interface 311. Storage means 116 can be placed on movable object 118 (cf. FIG. 1) or can be placed at a remote location which is, for example, accessible via wireless communication. Alternatively, storage means 116 can be integrated into component 300 (illustrated in FIG. 2 by storage means 116 being placed on the component 300 boarder). Interface 311 and interface 162 (cf. FIG. 1) can be implemented in a single physical interface.

Location determination component 312 is able to obtain geo-positional data of the current position $OL_i$ of movable object 118 (cf. FIG. 1).

In one embodiment, location determination can be based upon a satellite based positioning system. Examples for such systems are the Global Positioning Systems (GPS): NAVSTAR GPS, GLONASS, Galileo, and Compass. In another embodiment, the GPS data received by the location determination component may be combined with a correction signal from a stationary GPS reference station (Differential Global Positioning System (DGPS)) for improving accuracy.

In another embodiment, the geo-positional data may be obtained from radio signals in cell phone networks or proximity sensing of radio-frequency identification (RFID) signals emitted by other objects. Techniques for the geo-position calculation are known in the art, for example, as lateration and triangulation.

In yet another embodiment, the geo-positional data may be obtained by techniques which are based upon known or estimated speeds over elapsed time and course of movable object 118 (cf. FIG. 1) with respect to an initial location (Dead Reckoning). In addition, for example, during movement of object 118 (cf. FIG. 1), an on-board camera (the on-board camera is not necessarily part of the surveillance network, but rather used for the localization technique) can be used for self-localization of object 118 (cf. FIG. 1) in a geo-referenced 3D model of the surveillance area. The FOV of the on-board camera can then be set into correspondence with the 3D model. Such techniques are known in the art as Simultaneous Localization and Mapping (SLAM) and can be more accurate than satellite based positioning systems, for instance, during movement.

In another embodiment, a satellite based positing system may be combined with a Dead Reckoning and/or SLAM technique. If movable object 118 (cf. FIG. 1) is steady, for example, in a traffic jam, and sufficient satellite signals are available, the satellite based geo-positional data may be used. However, if the object is moving and/or the accuracy of the satellite based positioning system is below a certain threshold, for example 5 meters, or when the satellite signal is completely blocked (e.g., in a tunnel), the Dead Reckoning and/or SLAM technique can be used in order to obtain the geo-positional data of movable object 118 (cf. FIG. 1).

Indicator component 314 may generate and/or associate an indicator $I_i$ to the current geo-positional data $OL_i$ of movable object 118 (cf. FIG. 1).

In one embodiment, a single measurement value of the geo-positional data is associated with a unique indicator. Such a unique indicator can be, for example, a time stamp, such as the time received in the signal of a satellite based positing system.

In another embodiment, the indicator can have one value of a binary state, wherein repeating the indicator in a pseudo-randomized manner generates a pseudo-randomized pattern of binary digits. The measurement values of the geo-positional data may then be associated with the respective state of the binary digit at the corresponding moment of measuring. The sequence of associated data (e.g., $(OL_i, I_i)$) reflects the pseudo-randomized pattern of binary digits.

The geo-positional data of movable object 118 (cf. FIG. 1) and the associated indicator $(OL_i, I_i)$ may be sent to a communicatively coupled storage means 116 via interface 311.

Encoder Component 316 encodes the indicator $I_i$ into a respective signal (encoded indicator $I_i'$) which can be transmitted by optical transmitter 318.

In one embodiment, the encoded indicator $I_i'$ may have been prepared for a parallel optical transmission. Optical transmitter 318 for a parallel transmission can be, for example, a light emitting diode (LED) array. (The term LED should be understood to include light emitting devices in general.) Each LED would operate in a binary mode, which means, the LED is either "on" or "off", it either emits light or it remains dark. In this embodiment a unique indicator $I_i$ may be transmitted. A LED-array of 16 binary LEDs, for example, is able to transmit $2^{16}$ distinct values. Such an amount of values is theoretically sufficient to identify every 1/10 second within 1 hour and 49 minutes. Persons of skill in the art can select the most suitable size of the LED-array for later image processing for, for example, cameras with a low resolution, and/or add capabilities for error correction.

In another embodiment, the encoded indicator $I_i'$ may have been prepared for a serial optical transmission. Optical transmitter 318 for a serial transmission can be, for example, one binary LED or an LED-array which transmits one value of a binary state at a time at, for instance, 10 Hz. In this embodiment, the pattern of binary digits is represented by sequence of frames 140 (cf. FIG. 1) when movable object 118 (cf. FIG. 1) is in the FOV of camera 150 (cf. FIG. 1).

Figure 5:
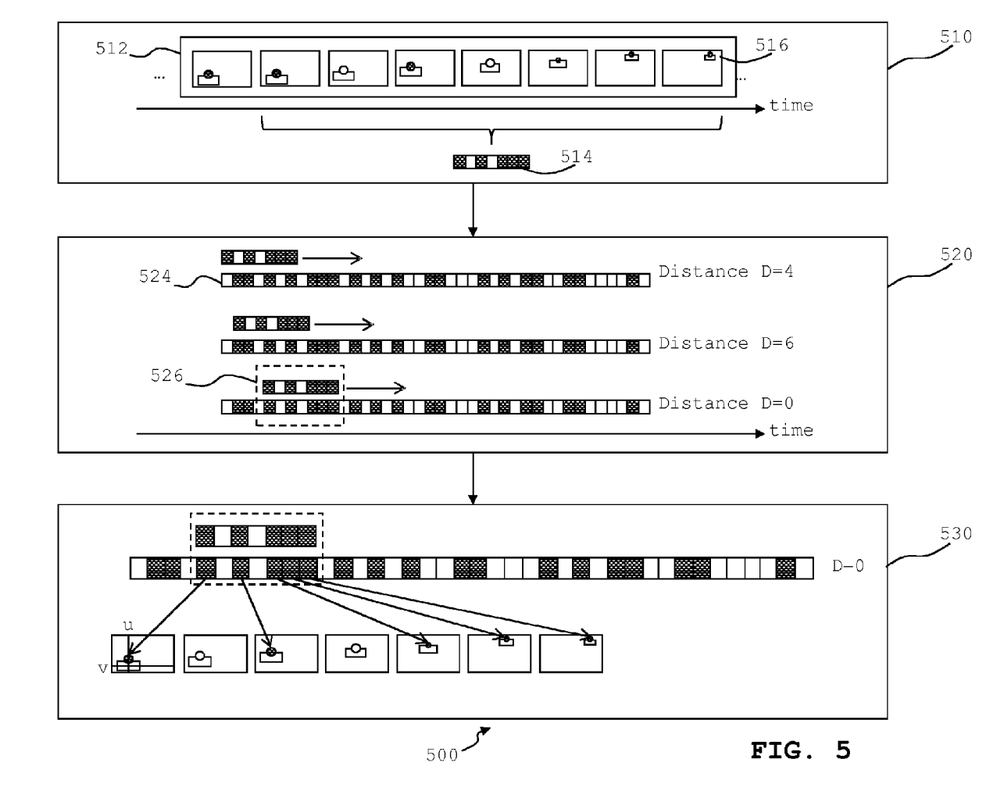
FIG. 5 shows the extraction and matching of a pattern of indicators to a reference sequence of indicators according to one embodiment of the invention.

FIG. 5 illustrates the extraction and matching of a pattern of indicators to a reference sequence of indicators according to one embodiment of the invention. For example, in this serial transmission mode, process 500 is performed in the following steps: extracting 510 pattern 514 of indicators from the video data of a camera, matching 520 extracted pattern 514 to continuous reference sequence 524 of indicators associated with the geo-positional data, and assigning 530 the geo-positional data to the respective screen/frame coordinates (u,v).

The video data of the camera, for instance, includes an image of movable object 128 (cf. FIG. 1) and the encoded indicator which is represented by the appearance of the optical transmitter. The video data is basically a sequence of frames 512. The indicator shown on frame 516 can be, for instance, in one of two states (e.g., [0|1]; in FIG. 5, '0' is illustrated as a white dot and '1' as a dashed-black dot). In a typical scenario of an urban surveillance area, for example, an object such as a car is driving through the FOV of a camera between 10 to 30 seconds at a speed of maximal 40 kilometers per hour (km/h). The camera typically has a rate of 20 fps, thus, the car is shown on 200 to 600 frames. In this scenario, the optical transmission of the indicator should at least last 100 ms (2 frames) per state in order to avoid aliasing; this is due to the Nyquist theorem, as known in the art. Therefore, at least 100 state periods can be observed, which results in at least $2^{100}$ possible different sequences of indicators for the time period the car is shown on the video data. By using image processing and computer vision techniques pattern 514 of the sequence of indicators can be extracted from the video data.

The datasets of geo-positional data from movable object 118 (cf. FIG. 1) may include the associated indicator, for example, a satellite based positioning system can be used to provide tuples of (latitude, longitude, indicator state=1|0) for every 50 to 100 ms. Thus, continuous reference sequence 524 of indicators can be obtained from this data. In order to match extracted pattern 514 with continuous reference sequence 524 of indicators, extracted pattern 514 can be slid along sequence 524 and a distance measurement can be applied. For example, as shown in FIG. 5, an absolute difference D can be used for the similarity measurement. The result with the lowest distance D (D=0), for instance, may then identify pattern 514 in reference sequence 524 of indicators (the match is illustrated in FIG. 5 with dashed box 526). The absolute difference D is calculated as $D=\Sigma_{i-1}^{n}|a_i-b_i|$, wherein n is the length of the vector of the extracted pattern a, and b is the corresponding vector of the reference sequence of indicators.

For similarity measurement also other techniques can be applied, such as:
  Euclidean distance
  Correlation
  Dynamic Time Warping
  Levenshtein distance Identified pattern 514 in continuous sequence 524 of indicators allows deducing the geo-positional information of the moving object which is shown in the corresponding frame. This geo-positional information can then be assigned to the respective screen/frame coordinates (u,v) of the at least one reference point of optically recognizable structure 210/220 (cf. FIG. 2) at movable object 128 (cf. FIG. 1).

Figure 8:
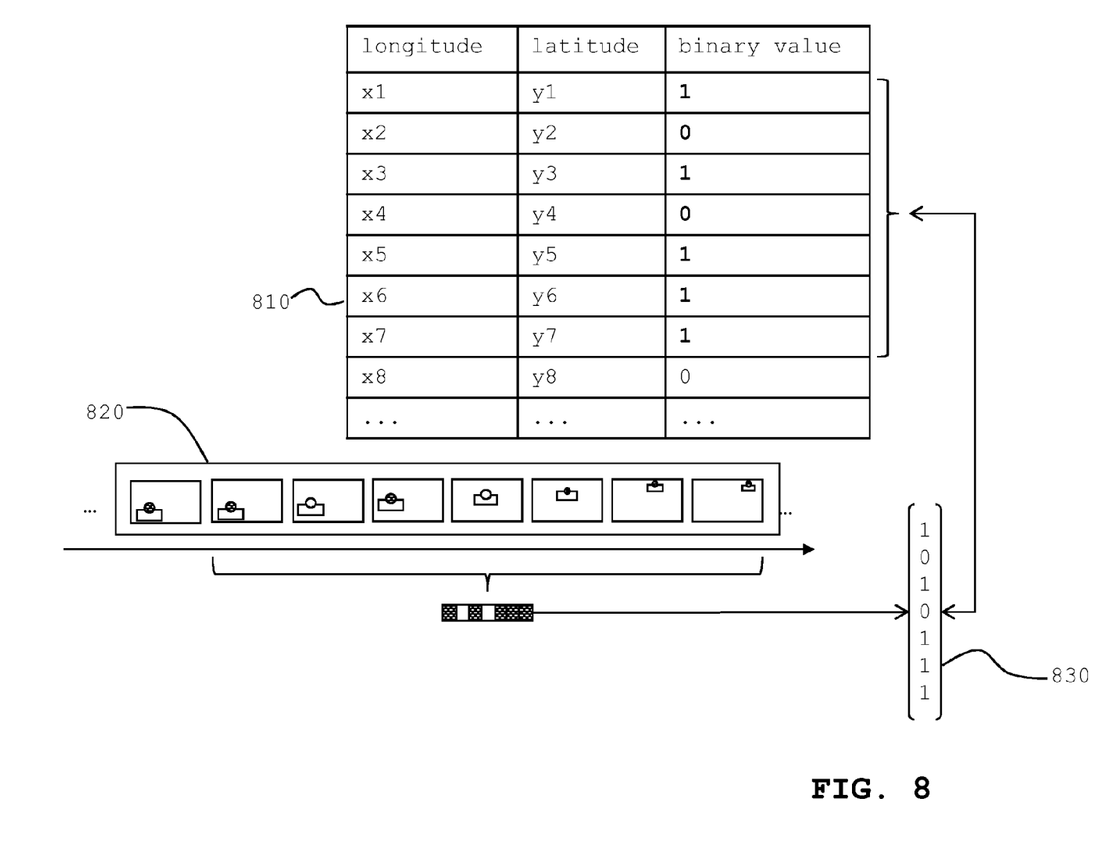
FIG. 8 shows an exemplary matching of sequentially transmitted binary values to geo-positional data.

Additionally, FIG. 8 illustrates an exemplary matching of sequentially transmitted binary values to geo-positional data, that is, the correlation of extracted pattern 514 (cf. FIG. 5) to reference sequence 524 (cf. FIG. 5) in a dataset of geo-positional data 810 (e.g., [longitude, latitude, binary value]). Pattern 514 (cf. FIG. 5) is extracted from sequence of frames 512 (cf. FIG. 5)/820, for example, in FIG. 8, the pattern is depicted as vector 830. Vector 830 can then be matched to a corresponding vector in the dataset of geo-positional data 810.

Figure 6:
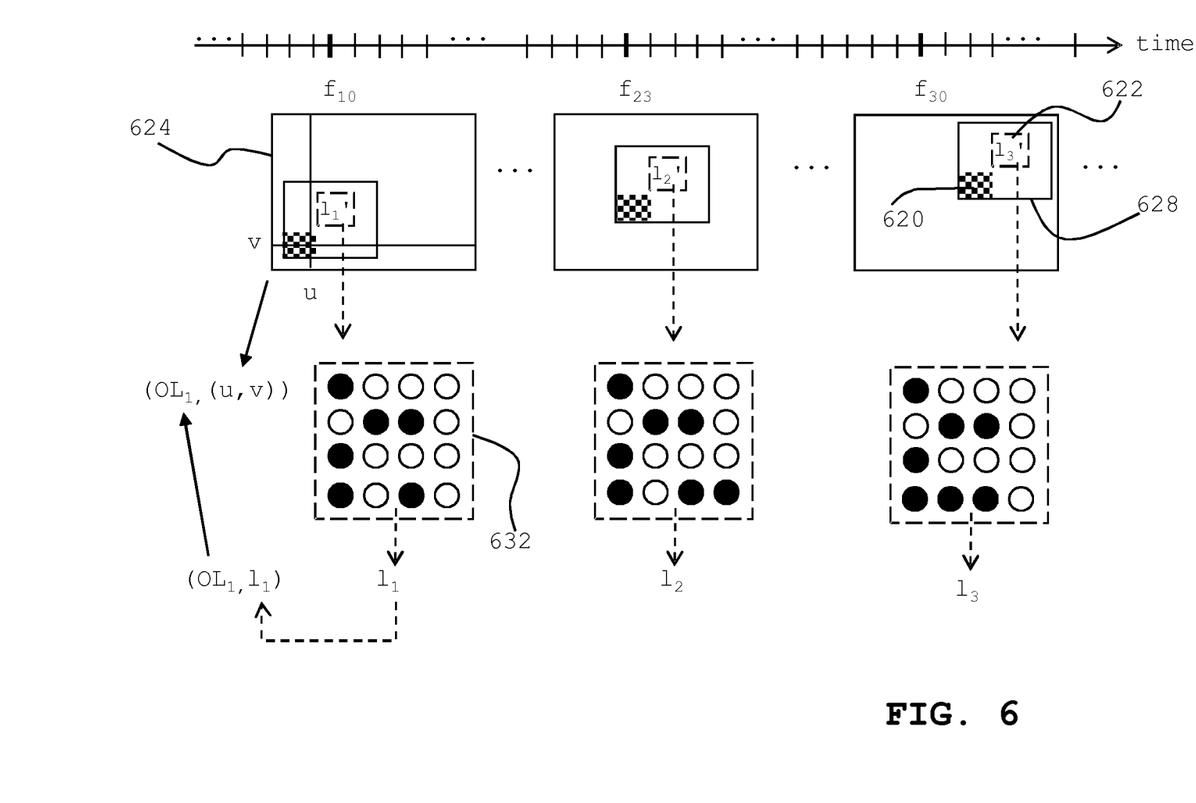
FIG. 6 shows the extraction, decoding, and matching of an indicator of a particular frame to the indicator associated with geo-positional data of a movable object according to one embodiment of the invention.

FIG. 6 illustrates the extraction, decoding, and matching of an indicator of a particular frame to the indicator associated with geo-positional data of movable object 118 (cf. FIG. 1) according to one embodiment of the invention. For example, in this parallel transmission mode, frames of a camera show a picture of movable object 628 and its optically recognizable structure 620 as well as its optical transmitter 622. The optical transmitter includes, for example, array 632 with 16 binary LEDs, thus, array 632 is able to transmit $2^{16}$ distinct values. The transmitter, for example, emits the values at a frequency of 10 Hz and is, therefore, capable of covering more than 100 minutes with distinct values.

If movable object 118 (cf. FIG. 1), for example, is shown in the FOV of camera 150 (cf. FIG. 1), the array 632 in, for instance, frame 624 can be analyzed by image processing and computer vision techniques. By decoding the encoded indicator the distinct time value of indicator $I_1$ of frame 624 can be obtained. Indicator $I_1$ is also associated with geo-positional data $OL_1$ of movable object 118 (cf. FIG. 1)/628. Therefore, the geo-positional data of movable object 628 can be matched to the screen/frame coordinates (u,v) of the at least one reference point from optically recognizable structure 620 shown in the picture. In this embodiment, any frame which shows movable object 628 can be used for matching geo-positional data to the screen/frame coordinates of the corresponding frame.

Figure 7:
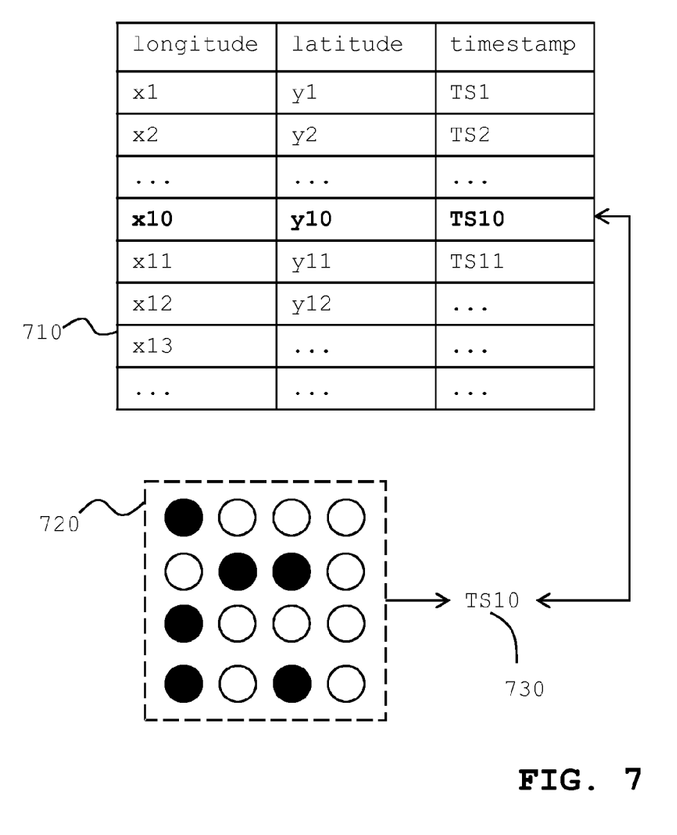
FIG. 7 shows an exemplary matching of a simultaneous transmitted binary map pattern to geo-positional data.

FIG. 7 shows an exemplary matching of a simultaneous transmitted binary map pattern to geo-positional data; and Additionally, FIG. 7 shows an exemplary matching of binary map pattern 720/632 (cf. FIG. 6), which is transmitted in parallel mode, to the dataset of geo-positional data 710. From the array 720/632 (cf. FIG. 6) the indicator 730 can be obtained and then be matched to the respective indicator in the dataset of geo-positional data 710. In this embodiment, the indicator is a timestamp from, for example, a satellite based positioning system. The timestamp 730 can be used to precisely deduce a specific entry in dataset 710.

Figure 4:
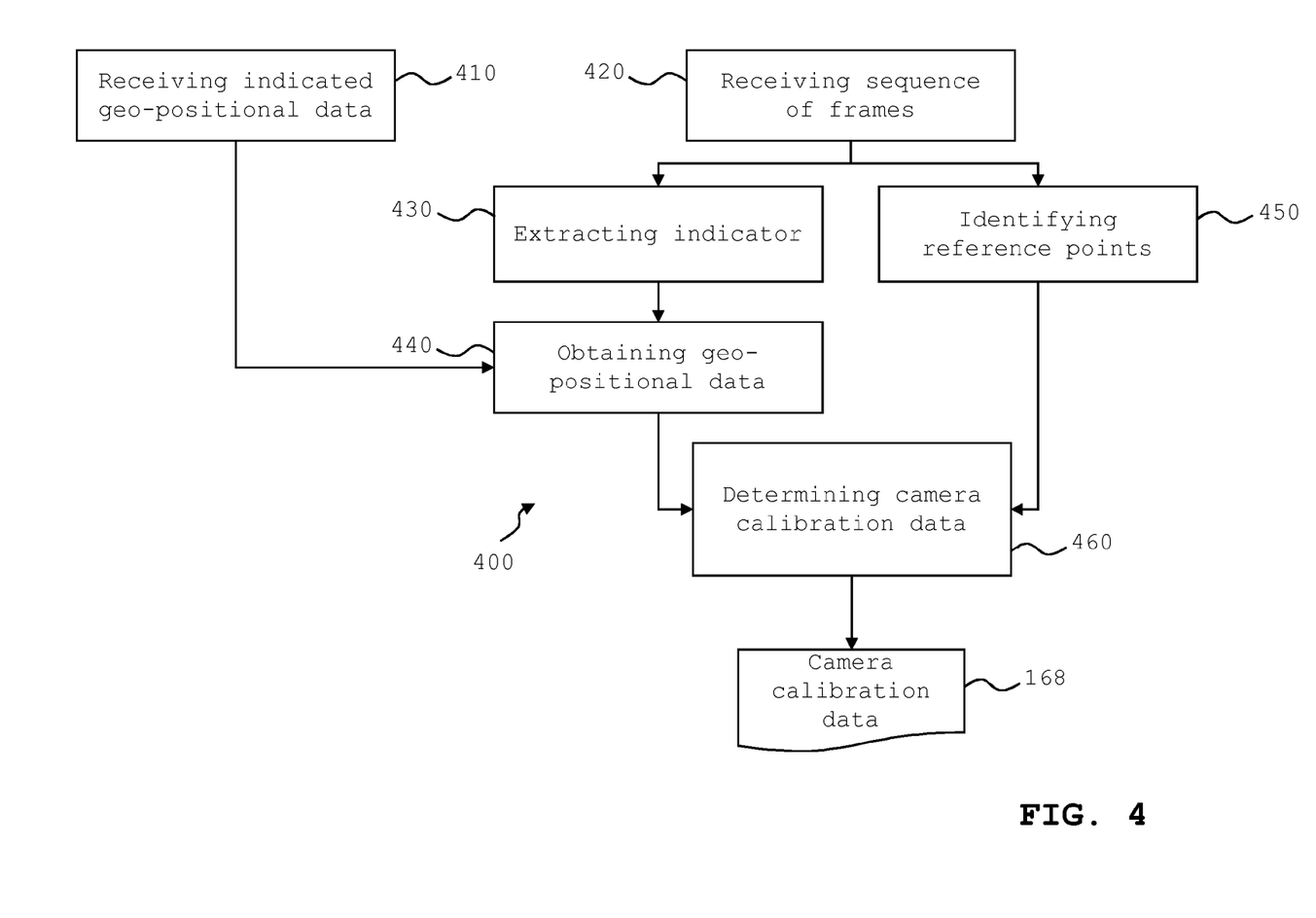
FIG. 4 is a flow chart of a computer implemented method according to one embodiment of the invention.

FIG. 4 is a flow chart of a computer implemented method 400 according to one embodiment of the invention for determining camera calibration data 168 (cf. FIG. 1) of at least one camera 150 (cf. FIG. 1). The method starts with receiving 410 geo-positional data of moving object 118 (cf. FIG. 1), wherein the geo-positional data is associated with an indicator; and further, receiving 420 sequence of frames 140 (cf. FIG. 1) from the at least one camera, wherein at least one frame has a picture of moving object 128 (cf. FIG. 1) with structure 120 (cf. FIG. 1) and with an encoded version of the indicator which both are optically recognizable.

In reference to FIG. 1, the geo-positional data of moving object 118 and the sequence of frames 140 may be received by interfaces 162 and 164 of computer system 160, respectively.

Returning back to FIG. 4, the method proceeds with extracting 430 the indicator associated with the at least one frame by decoding the optically encoded version of the indicator of the at least one frame. Then, obtaining 440 the geo-positional data of moving object 128 (cf. FIG. 1) which is in the picture of the at least one frame by matching the indicator associated with the geo-positional data of moving object 118 (cf. FIG. 1) and the decoded indicator associated with the at least one frame.

Further, as soon as the sequence of frames 140 (cf. FIG. 1) is received 420, the computer system identifies 450 at least one reference point of the at least one frame by analyzing optically recognizable structure 120 (cf. FIG. 1) in the picture of the at least one frame.

The results of step 440 and step 450 can then be used for determining 460 camera calibration data 168 (cf. FIG. 1) of the at least one camera by applying a geometric transformation on the at least one reference point and its associated geo-positional data of the moving object which is in the at least one frame.

In reference to FIG. 1, decoding and matching of the method illustrated in FIG. 4 may be performed by decoder component 170 and matcher component 172; further, identification of reference points 450 and the geometric transformation 460 may be performed by transformer component 174.

Embodiments of the invention can be implemented in digital electronic circuitry, or in computer hardware, firmware, software, or in combinations of them. The invention can be implemented as a computer program product, for example, a computer program tangibly embodied in an information carrier, for example, in a machine-readable storage device, for execution by, or to control the operation of, data processing apparatus, for example, a programmable processor, a computer, or multiple computers. A computer program as claimed can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network. The described methods can all be executed by corresponding computer products on the respective devices, for example, the first and second computers, the trusted computers and the communication means.

Method steps of the invention can be performed by one or more programmable processors executing a computer program to perform functions of the invention by operating on input data and generating output. Method steps can also be performed by, and apparatus of the invention can be implemented as, special purpose logic circuitry, for example, a field programmable gate array (FPGA) or an application-specific integrated circuit (ASIC).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, optical disks or solid state disks. Such storage means may also provisioned on demand and be accessible through the Internet (e.g., Cloud Computing). Information carriers suitable for embodying computer program instructions and data include all forms of non-volatile memory, including by way of example semiconductor memory devices, for example, EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, for example, a cathode ray tube (CRT) or liquid crystal display (LCD) monitor, for displaying information to the user and an input device such as a keyboard, touchscreen or touchpad, a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

The invention can be implemented in a computing system that includes a back-end component, for example, as a data server, or that includes a middleware component, for example, an application server, or that includes a front-end component, for example, a client computer having a graphical user interface or a Web browser through which a user can interact with an implementation of the invention, or any combination of such back-end, middleware, or front-end components. Client computers can also be mobile devices, such as smartphones, tablet PCs or any other handheld or wearable computing device. The components of the system can be interconnected by any form or medium of digital data communication, for example, a communication network. Examples of communication networks include a local area network (LAN) and a wide area network (WAN), for example, the Internet or wireless LAN or telecommunication networks.

The computing system can include clients and servers. A client and a server are generally remote from each other and typically interact through a communication network. The relationship of client and server arises by virtue of computer programs running on the respective computers and having a client-server relationship to each other.

The invention claimed is:

1. A computer system, comprising:
   a first interface adapted to receive geo-positional data of a movable object, wherein the geo-positional data is associated with an indicator;
   a second interface adapted to receive a sequence of frames from at least one camera, wherein at least one frame has a picture of the movable object with an optically recognizable structure and with an optically encoded version of the indicator;
   a decoder component configured to obtain the indicator associated with the at least one frame by decoding the optically encoded version of the indicator of the at least one frame;
   a matcher component configured to obtain the geo-positional data of the movable object which is in the picture of the at least one frame by matching the indicator associated with the geo-positional data of the movable object and the decoded indicator associated with the at least one frame; and
   a transformer component configured to obtain at least one reference point of the at least one frame by analyzing the optically recognizable structure in the picture of the at least one frame, and to obtain camera calibration data of the at least one camera by applying a geometric transformation on the at least one reference point and its associated geo-positional data of the movable object which is in the at least one frame.

2. The computer system of claim 1, further comprising:
   a third interface adapted to dispatch the camera calibration data of the at least one camera to a camera management component.

3. The computer system of claim 2, wherein the camera management component is part of a video management system.

4. The computer system of claim 1, wherein the optically encoded version of the indicator is received in a parallel mode.

5. The computer system of claim 1, wherein the optically encoded version of the indicator is received in a serial mode, wherein the optically encoded version of the indicator is included in the sequence of frames.

6. The computer system of claim 5, wherein the decoder component is configured to determine a pattern of indicators in the sequence of frames which is matchable with a corresponding pattern of indicators associated with the geo-positional data.

7. The computer system of claim 1, wherein the at least four reference points are obtainable from the same frame.

8. A movable object having a structure which is optically recognizable by at least one camera, comprising:
- a location determination component adapted to determine geo-positional data of the movable object;
- an indicator component configured to associate an indicator with the geo-positional data of the movable object;
- an encoder component configured to encode the indicator;
- an optical transmitter configured to transmit the encoded indicator which is recognizable by the at least one camera;
- a first interface adapted to send the indicator and the geo-positional data of the movable object to a storage means; and
- a second interface adapted to communicate the indicator and the geo-positional data of the movable object to a physically separate processing unit that also communicates with the at least one camera for determining camera calibration data of the at least one camera.

9. The movable object of claim 8, wherein at least one reference point of the optically recognizable structure is identifiable by an image recognition function of the physically separate processing unit.

10. The movable object of claim 8 or 9, wherein the geo-positional data is obtained from anyone or a combination of anyone of the following:
- satellite based positioning
- radio frequency identification
- dead reckoning
- simultaneous localization and mapping.

11. A computer implemented method for determining camera calibration data of at least one camera, comprising:
- receiving geo-positional data of a moving object, wherein the geo-positional data is associated with an indicator;
- receiving a sequence of frames from the at least one camera, wherein at least one frame has a picture of the moving object with a structure and with an encoded version of the indicator which are optically recognizable;
- extracting the indicator associated with the at least one frame by decoding the optically encoded version of the indicator of the at least one frame;
- obtaining the geo-positional data of the moving object which is in the picture of the at least one frame by matching the indicator associated with the geo-positional data of the moving object and the decoded indicator associated with the at least one frame;
- identifying at least one reference point of the at least one frame by analyzing the optically recognizable structure in the picture of the at least one frame; and
- determining the camera calibration data of the at least one camera by applying a geometric transformation on the at least one reference point and its associated geo-positional data of the moving object which is in the at least one frame.

12. The method of claim 11, wherein the optically encoded version of the indicator is received in a parallel mode and wherein the decoded indicator is being matched with an indicator associated with an entry of the geo-positional data.

13. The method of claim 11, wherein the optically encoded version of the indicator is received in a serial mode and wherein the sequence of frames determines a pattern which is being matched with a corresponding pattern of indicators associated with the geo-positional data.

* * * * *